US009817872B2

(12) United States Patent
Pamu et al.

(10) Patent No.: US 9,817,872 B2
(45) Date of Patent: Nov. 14, 2017

(54) METHOD AND APPARATUS FOR SOCIAL TRUST NETWORKS ON MESSAGING PLATFORMS

(75) Inventors: Gautham Pamu, Round Rock, TX (US); Richard W. Ragan, Jr., Round Rock, TX (US); Yongshin Yu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 570 days.

(21) Appl. No.: 12/411,683

(22) Filed: Mar. 26, 2009

(65) Prior Publication Data

US 2010/0250605 A1    Sep. 30, 2010

(51) Int. Cl.
*G06F 17/30* (2006.01)

(52) U.S. Cl.
CPC .............................. *G06F 17/30533* (2013.01)

(58) Field of Classification Search
CPC .. G06Q 10/10; G06Q 30/02; H04L 29/08936; H04L 67/306; G06F 17/3053
USPC ................................................ 707/781, 783
See application file for complete search history.

(56) References Cited

U.S. PATENT DOCUMENTS

| 7,249,123 | B2  |   | 7/2007 | Elder et al. |
| 7,567,977 | B1 | * | 7/2009 | White |
| 7,802,290 | B1 | * | 9/2010 | Bansal et al. ..................... 726/3 |
| 2004/0122681 | A1 |   | 6/2004 | Ruvolo et al. |
| 2005/0256866 | A1 | * | 11/2005 | Lu ...................... G06F 17/30867 |
| 2006/0042483 | A1 | * | 3/2006 | Work et al. ...................... 101/91 |
| 2006/0064431 | A1 | * | 3/2006 | Kishore et al. ............... 707/102 |
| 2006/0294134 | A1 | * | 12/2006 | Berkhim et al. ............. 707/102 |
| 2007/0100699 | A1 | * | 5/2007 | Ajizadeh ......................... 705/14 |
| 2008/0275719 | A1 | * | 11/2008 | Davis et al. ...................... 705/1 |
| 2009/0024629 | A1 | * | 1/2009 | Miyauchi ............ G06F 21/6218 |
| 2009/0210904 | A1 | * | 8/2009 | Baron et al. ..................... 725/39 |
| 2009/0234945 | A1 | * | 9/2009 | Chande et al. ............... 709/224 |
| 2010/0121849 | A1 | * | 5/2010 | Goeldi ......................... 707/736 |
| 2010/0146118 | A1 | * | 6/2010 | Wie ............................. 709/225 |
| 2010/0169265 | A1 | * | 7/2010 | Ristock et al. ................. 706/52 |

* cited by examiner

*Primary Examiner* — Kris Mackes
*Assistant Examiner* — Soheila (Gina) Davanlou
(74) *Attorney, Agent, or Firm* — Whitham, Curtis & Cook, PC; David Woycechowsky

(57) ABSTRACT

A social trust network is implemented in combination with a communication network capable of monitoring one or more parameters of communications. The social trust network includes a database containing trust data and possibly profiles of respective entities can be searched to return identities of entities such as subject matter experts with whom a user such as a decision-maker may wish to communicate; which communication may be facilitated by communication contact information corresponding to entities returned by the search. A plurality of trust metrics are computed from the trust data and search results are ordered based on a weighted sum of trust metrics, possibly including ratings of entities, where the relative weights may be manipulated at the will of the user. The monitored parameters of such communications are represented in data stored as trust data in a database which is thus adaptively developed through use of the social trust network.

16 Claims, 7 Drawing Sheets

METHOD AND APPARATUS FOR SOCIAL TRUST NETWORKS ON MESSAGING PLATFORMS

FIELD OF THE INVENTION

The present invention generally relates to social trust networks and, more particularly, to adaptively developing social trust networks implemented through messaging platforms which can automatically provide additional input thereto, especially to facilitate locating persons or entities having expertise with particular subject matter for assistance in making informed decisions.

BACKGROUND OF THE INVENTION

Many persons, particularly when charged with management authority in commercial circumstances, are frequently faced with the need to make important decisions which must be based on the best information available. In such circumstances, it is considered to be a good practice to seek input from persons having recognized expertise with subject matter which is relevant to various aspects of the decision to be made. Therefore, it is desirable to not only locate persons with suitable expertise but also quantitatively evaluate not only their expertise but the level and quality of assistance they have been able to provide when their expertise has been previously sought by the decision-maker and others. Thus, when an informed decision is to be made, the decision-maker is required to actively pursue subject matter experts who may not be initially known to the decision-maker. At the present state of the art, messaging systems would be convenient for the numerous communications that would be involved in a search for suitable experts.

One technique for locating subject matter experts is by searching a directory that scans profiles of persons for whom records are kept, such as employees of a company, to locate persons who are likely to have developed expertise in regard to particular subject matter through their experience within the company or through prior experience or study. Such searching is somewhat difficult, however, because such profiles are not optimal indicators of a person's expertise and do not generally reflect the quality of assistance they have provided in the past or are likely to provide in the future. Thus, it is often at least equally effective, due to some level of existing social knowledge, to attempt to locate subject matter experts through associations (either personal associations or interest area organizations) and referrals from others with whom the decision-maker is acquainted. However, while social structures that may develop around a decision-maker may contain a large amount of collective experience, they often have little organizational structure that can be exploited in regard to particular subject matter expertise and therefore searching through such informal social structures can be quite time-consuming with no guarantee of success in locating a person with particular subject matter expertise or any assurance of the comparative quality of the expert that is found.

In social networking, relationships are usually built on trust developed over time between individuals. Currently, so-called recommender systems are known which attempt to leverage a metric of trust in order to recommend particular items of a set of items based on a function of trust between two individuals. However, such systems rely on manual input of information in regard to the metric of trust; which manual input may be inconsistently performed and difficult to maintain. Further, such systems are difficult to integrate with any system for facilitating the ultimate function of obtaining useful information.

Rating arrangements are also known which may provide for quantitative comparisons among experts. However, inputs to such arrangements are generally subject to subjective judgement and, therefore, inconsistency in quantitative ratings. Further, such arrangements are subject to being biased by collusion between persons being rated and those providing input to the rating arrangement and are otherwise difficult to control and administer. Moreover, like recommender systems, rating arrangements only develop through manual input.

SUMMARY OF THE INVENTION

It is therefore an object of the present invention to provide a social trust network system and method which can be implemented through a messaging platform and can receive direct and automatic input therefrom.

In order to accomplish these and other objects of the invention, a social trust network implemented in combination with a networked communication platform is provided comprising a processor including an application for conducting a search of a database to return identifications of entities and corresponding trust data and communication data, a trust network platform including an aggregate trust engine for computing a trust metric from the trust data, an arrangement operatively associated with the networked communications platform for selective communication with entities using the communication data, a monitoring arrangement for determining a parameter of the selective communications, and a user trust management subsystem for deriving additional trust data from the parameter of the selective communications and storing the additional trust data in the database.

In accordance with another aspect of the invention, a method of identifying trusted entities is provided comprising steps of searching a database containing at least profiles and trust data corresponding to respective entities, computing a trust metric from trust data, reporting results of the search in accordance with the trust metric, selectively conducting communications with entities included in results reported, monitoring a parameter of the communications, and storing data corresponding to the parameter as trust data.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1A:
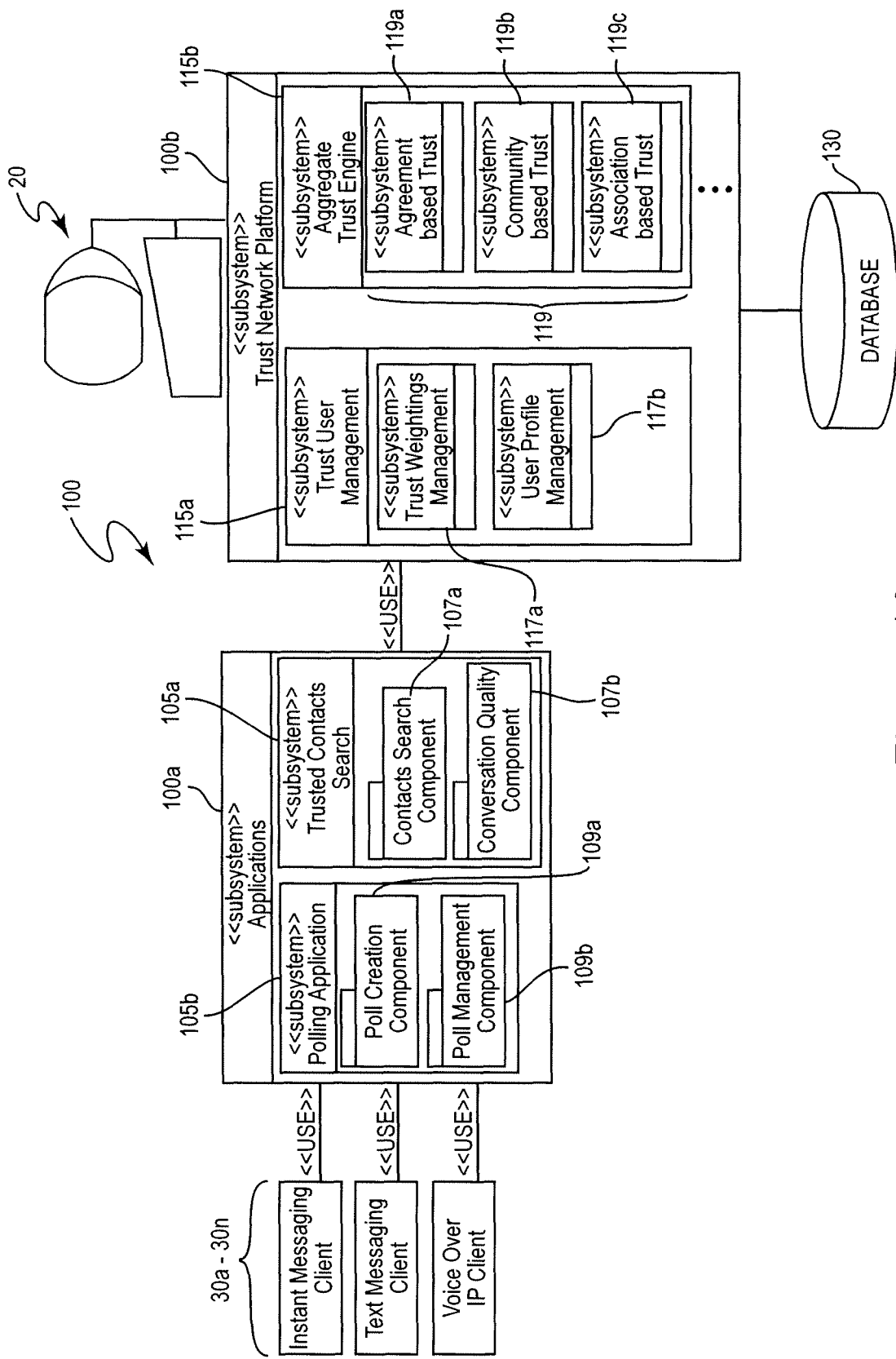
FIGS. 1A and 1B are high level block diagrams of the invention together with an exemplary environment for its application and which can also be understood as information flow diagrams.
Figure 1B:
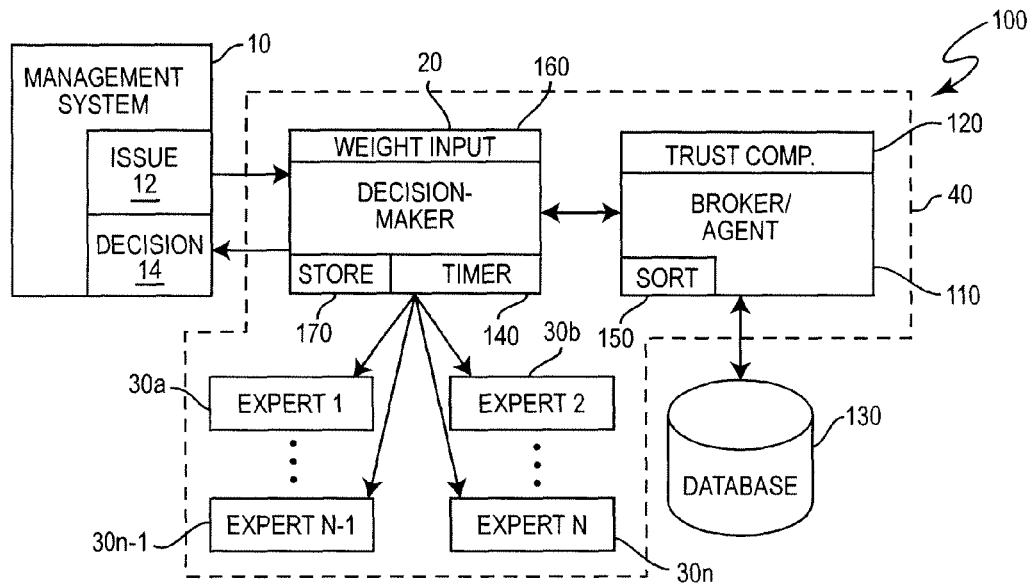

Referring now to the drawings, and more particularly to FIGS. 1A and 1B, there is shown a high-level block diagram or information flow diagram of the invention (generally indicated at 100) in an exemplary environment for its application. FIG. 1A illustrates the invention in a manner emphasizing the basic types of functions performed while FIG. 1B illustrates the invention in a manner to emphasize a preferred architecture for implementation of the invention in hardware or software or a combination thereof. Where possible, the same reference numerals are used for elements illustrated in both Figures. Specifically, the experts/clients 30a-30n and database 130 are depicted at what may be considered as opposite ends of the system of the invention with a plurality of functions or functional elements between them.

In FIG. 1A, the experts or clients 30a-30n are depicted at the left side of the Figure and communicate with the system by various technologies such as so-called instant messaging, text messaging or Voice over Internet Protocol (VoIP). It should be understood that in this depiction, the user or person seeking expertise and/or assistance may be considered as being a client 30A-30n, as well as a potential expert in regard to other clients that may be potential experts in regard to the user. The functions of the invention are illustrated as being of two basic groups or subsystems: Applications 100a to perform basic communication and response functions and a trust network platform 100b which performs data collection, trust metric computation and general management of and access to database 130.

Within application subsystem 100a, any desired communication or information gathering application desired may be provided; two exemplary applications 105a and 105b being shown, each of which is provided with selective communications capability and an arrangement for monitoring at least one parameter of any communication conducted. Selective communications capabilities would generally be preferably provided in components 107a and 109a while the arrangement for monitoring a parameter of the communication would generally be a preferred capability of components 107b and 109b.

The trusted contacts search application 105a is a basic search application that is a fundamental desired function of the invention. The trusted contact search preferably includes a contacts search component 107a and a conversation quality component 107b as will be discussed in greater detail below. Polling application 105b is a preferred exemplary optional application that may be used to facilitate information gathering from a plurality of experts/clients and can be particularly useful for developing a consensus. Polling application 105b includes a poll creation component 109a for interactively developing a poll (e.g. an inquiry and a list of those to be polled) and a poll management component 109b for reporting results of the poll and developing trust data from those results and the use made of them by the decision-maker. Other applications may also be included as may be desired and will generally, like the exemplary applications illustrated, include a component to control the basic function of the application and another to collect the requested information and, importantly, extract information from it that allows the database to adaptively develop and which automatically maintains currency of data for use in subsequent searches or further refinement of a current search.

Similarly, the trust network platform subsystem 100b preferably includes two subsystems. A trust user management subsystem 115a which basically performs trust computations (also illustrated at 120 of FIG. 1B), which will be described in greater detail below, and which communicates results of such computations to a user/client 30a-30n and to database 130. These functions can be visualized as a trust weightings management function 117a and a user profile management function 117b. An aggregate trust engine 115b basically manages types of data from which trust metrics can be extracted: agreement based trust which corresponds to the historical record of whether or not users have agreed with the assistance obtained from a given expert, community based trust which reflects the experience of a community of users, and association based trust which reflects social network hierarchies. Other or additional types of data which are deemed to be suitable for a trust metric to be predicated thereon may also be included and the data illustrated at 119a-119c should be regarded as exemplary and preferred. For example, other data types 119 may include ratings, subjective evaluations or the like as alluded to above which, while considered less reliable than preferred data types 119a-119c may nevertheless provide some potentially useful information in some circumstances.

Referring now to FIG. 1B, it should be understood that the connections between various elements (within dashed line 40) depicted in FIG. 1 are informational connections which can be provided through any of a number of messaging systems such as text messaging, so-called instant messaging, voice-over-internet protocol (VoIP) or the like or some combination thereof as alluded to above. Such communications are conducted through networked computers which can also monitor some aspects or parameters of the communications; the importance of which to the practice and meritorious effects of the invention will become clear from the following discussion.

It is assumed that there will be some entity which will present some issue or question to a person or user (hereinafter referred to as a decision-maker) that is responsible for making an informed decision in regard to the issue or question. In the current corporate, research and/or product development environment, particularly for large or distributed undertakings, such an entity will often be characterized as an enterprise having a management system as a constituent part thereof, as is depicted at 10 of FIG. 1B. It is to be understood, however, that such an enterprise and management system could be little more than a conceptual plan for carrying out a given project but could be highly structured and implemented in software running on numerous networked computers distributed over a wide geographic area that also perform logging of activities and collection of documentation regarding the project and any product of component thereof developed by the project. It is also to be understood that such an entity could and, indeed, is likely to concurrently and/or sequentially present numerous issues 12 to a plurality of decision-makers 20 which will return a similar plurality of decisions 14. Only one such issue 12, decision-maker 20 and decision 14 are illustrated in FIG. 1B while others are omitted in the interest of clarity. It is also to be understood that decision-maker 20, while depicted much in the nature or other hardware elements, such hardware is essentially a networked computer or terminal, wireless so-called personal digital assistant (PDA) or the like and operated by a human decision-maker although it is possible for the role of a human decision-maker to be fully automated, possibly as a so-called expert system.

Decision-maker 20 is also assumed to have a social network that will include one or more trusted experts 30a-30n (which may also be considered as including the decision-maker-user as alluded to above). Such trusted expert(s) of a given decision-maker's personal social network may have expertise which is limited to particular subject matter areas which are not necessarily exhaustive of the subject matter which may be involved in a decision. In fact, the expert(s) in a given decision-maker's personal social network may be limited to a single expert (such as a human resources director for a company) who is trusted to the extent of providing reliable referrals to other experts in that expert's personal social network, within the enterprise or otherwise available to provide information to the decision-maker. Conversely, it is to be understood that the personal social network of a given decision-maker can be, in effect, greatly augmented by the invention to include subject matter experts which are otherwise unknown to a given decision-maker 20 such as other persons in the same department or organization of the decision-maker or an expert known to the decision-maker.

As further depicted in FIG. 1B, the invention 100 also can be visualized as including an automated broker or agent 110 which includes the capacity for making some trust level computations in regard to at least one trust metric (as depicted at 120) and which has access to a database 130 which includes data in regard to persons or other entities such as groups of individuals or portions of an enterprise (that may or may not be the same as the enterprise from which a particular issue arises) all of which should be understood to be collectively included by the term "expert" as used hereinafter having expertise for certain subject matter areas and quantitative trust information initially stored or computed in accordance with the invention as will be described in greater detail below. Additionally, the decision-maker 20 is depicted as a computer, terminal, PDA or other messaging device and preferably includes timer 140 which should be understood as being collectively representative of any monitoring arrangement for monitoring any aspect (e.g. speaking tone or speed, use of terms of art and the like) of communications that may be deemed relevant or of interest to a trust metric of interest as generally depicted by conversation quality component 107b of FIG. 1A; the particulars of which are not critical to the successful practice of the invention while communication duration or length is preferred as ubiquitous, reliable and conveniently monitored. In this regard, it is to be noted that the duration or length of communications with an expert is deemed to be reliably relevant to a suitable trust metric since it is likely that communications will only continue during that the time or message length the information being exchanged is deemed to be of value to the decision-maker 20 or otherwise perceived as useful and relevant to the decision to be made.

The concept of the invention, at its most basic level is to incorporate a quantitative and adaptively developed trust evaluation mechanism with one or more forms of messaging or messaging platforms to facilitate finding of persons having information or insightful views in regard to the subject matter of a decision to be made as well as to facilitate the adaptive development of an expertise database within database 130. Using one or more metrics of trust, it is possible to find people that a decision-maker trusts or who is trusted by others associated in some way with the decision-maker 20 in regard to particular subject matter by simply inputting the subject matter area of interest and requesting a list, possibly ordered, of the most trusted expert(s) on that subject from the available population of experts. The invention also extends to facilitating contact with selected experts to obtain their "feedback" or input to the decision-maker 20 to facilitate making a properly informed decision. The feedback and/or parameters of the communication can also be monitored and/or evaluated (by virtue of communications being conducted over a messaging system) to adaptively develop a trust metric for each expert and subject matter combination and each type of data 119. The information adaptively built up in database 130 through use of the invention thus effectively becomes a community of trust and an extension of the social network of the decision-maker as well as an extension of the decision-maker personally. In this way, the community of trust can be leveraged to facilitate finding of information needed to make properly informed decisions by a decision-maker within that community.

In order to build a trust network, a trust metric that can be used to calculate a quantitative trust level or figure of merit must be defined. A trust level (or simply "trust") is differentiated from ratings, as alluded to above, as a different concept that may be applied on top of or cumulative with ratings which is a measure of the reputation of a person (e.g. as an expert) that is built up over time as a measure of that person's ability to produce or deliver reliable and useful information and, as such, is also a measure of some aspects of a relationship between a decision-maker and such a person. It is also preferred that different measures of trust be collected and used together in a weighted manner in order to avoid the trust value from being skewed by particular circumstances of the collection of information.

Figure 2A:
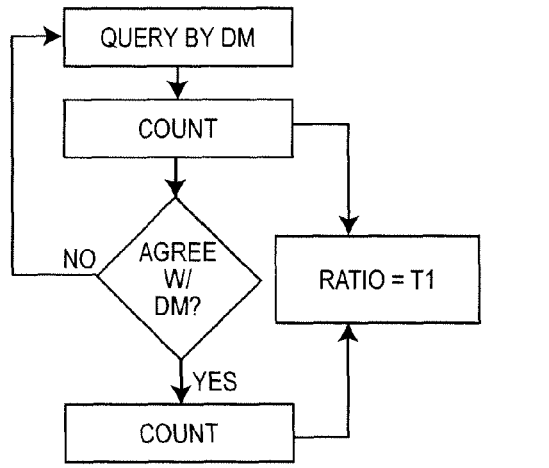
FIGS. 2A, 2B and 2C are diagrams illustrating exemplary known trust metrics usable with the invention.
Figure 2B:
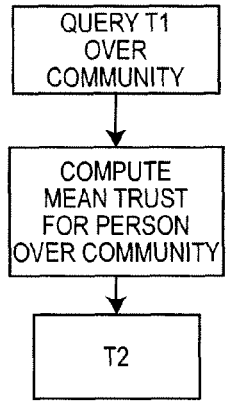

Specifically, the invention may be used to obtain improved performance even from known quantitative techniques for evaluating levels of trust. For example, equations included in "Trust-aware Collaborative Filtering for Recommender Systems" by Massa and Avesani (available through electronic publication) propose three measures of trust which may be combined in a weighted manner to derive an overall trust level/score. The three measures of trust are:
1.) trust based on agreement with a person—calculated as $$T1 = \frac{|AgreedInstances(\text{person, subject})|}{|AllInstances(\text{person, subject})|}$$

where the number of instances in which there was agreement between the person/expert and (in the case of the present invention) the decision-maker on a particular subject, as illustrated in FIG. 2A;
2.) trust based on community agreement—calculated as the aggregation of trust over an entire community (which community may be arbitrarily defined) and could, for example, be expressed as statistical aggregation, T2, such as an average or mean and variance of T1 values for the person in regard to each member of the community in regard to each subject with which a member of the community has experience with the person as illustrated in FIG. 2B; and
3.) trust by association with the person—a level of trust based on how closely the person is associated with (again, in the context of the present invention) the decision-maker either by the organizational aspect in a hierarchy of the decision-maker's personal social network or by direct contact and/or circumstances of collaboration between the person and the decision-maker which can be calculated as:

$$T3 = \frac{(d-n+1)}{d}$$

where d is the maximum propagation distance in the hierarchy (e.g. such as in a tree structure) of the decision-maker's personal social network and n (e.g. where experts at the n=1 level are personally known to the decision-maker, experts at level n=2 are known to experts at the n=1 level and so on) is the distance of the person from the decision-maker in that hierarchy. For example, for T3, if there is a maximum propagation depth or distance, d, of three (e.g. d=3) hierarchical levels and the person/expert is two levels away (e.g. expert 5 at n=2) from the decision-maker, then it is reasonable to evaluate the trust level as two-thirds of the trust level of a person having direct contact with the decision-maker. It is preferred in this regard to provide for selective exclusion or inclusion, as a default, of other persons in the same department, organization or the like with the user/decision-maker or others in the social network of the user-decision-maker at the appropriate hierarchical level of a hierarchical social network tree (depending on actual associations such that, for example, a person in the same department as a user or another person in the user's social network but with no actual associations with the user could be reported at least in the lowest level of the user's social network). Thus, the social network can be expanded or contracted as desired while maintaining a logical hierarchy while effects or branching of associations on trust as will be discussed below may be comparatively evaluated.

Other variations or relationships in the social network may also be included. For example, if a particular expert is reached through more than one branch of the decision-maker's social network indicating a higher degree of recognition among the population of the decision-maker's social network, the number of branches, b, through which the expert can be reached may be included in the evaluation (e.g. for expert 6 where b=2) as:

$$T3 = \frac{(d-n+b)}{d} = 1.$$

Figure 2D:
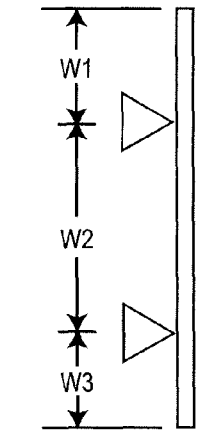
FIG. 2D illustrates a displayed graphic feature which is useful for manipulating and evaluating returned results of s search using the invention.
Figure 2C:
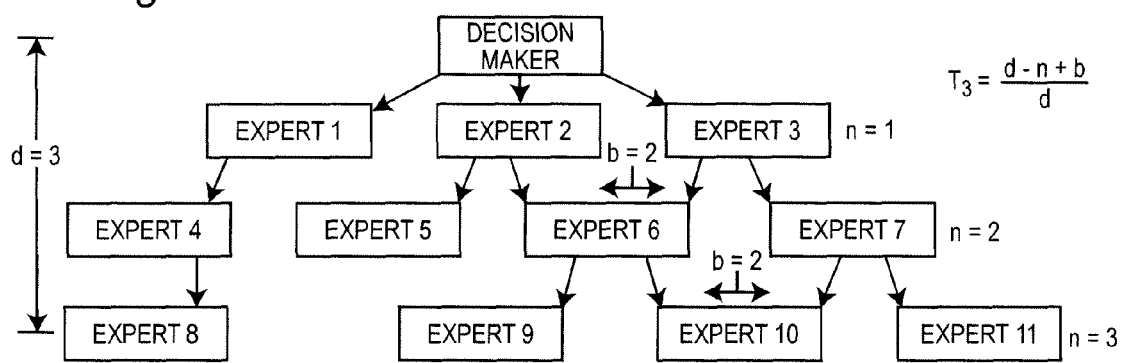

The overall trust level for the person/expert may then be evaluated as:

Overall trust=$W1*T1+W2*T2+W3*T3$ where W1, W2 and W3 are weights of the respective trust metrics. The user/decision-maker can freely control the weighting of all three trust metrics to customize the calculation of overall trust for specific scenarios and generally will do so based on accumulated experience relative to the perceived quality of feedback information received from experts to whom the decision-maker is more directly led when particular information is required. This may be implemented easily with a graphics feature such as that of FIG. 2D including an image of a slider with two knobs or cursors that can divide the slider length (e.g. W1+W2+W3=1) into three or more essentially arbitrary adjustable partitions with the resulting length of each partition representing a relative importance/weight of each trust metric. More or fewer trust metrics can be implemented and apportioned in such a manner without departing from the spirit and scope of the invention. It may also be useful in connection with the feature of FIG. 2D to include a concurrent window in the screen which presents an ordered list of potential experts which are ordered in descending order of calculated trust using the weighting of the trust metrics as the trust metrics are manipulated by a decision-maker. That is, where the ordering changes with relatively small changes in weights, there is probably substantial uncertainty between which expert may be more likely to provide the best advise and it may be determined that both or all such experts should be polled for their respective inputs. Conversely, where the ordering of experts is relatively insensitive to weights applied, a high confidence level is indicated for the expert indicated to be most highly trusted.

It should be appreciated that trust metrics as defined above or other suitable trust metrics which will be apparent to those skilled in the art are distinct from any metrics for the actual expertise that may be possessed by an expert such as might be indicated in a profile of an individual. Some degree of expertise in regard to particular subject matter may or may not be indicated for a particular individual in initial data stored in database 130 which may be obtained, for example, from profile evaluation in a known manner as alluded to above. Conversely, a person whose expertise is well-documented in such a profile may have personality characteristics which limit the ability of such a person to deliver useful information, insight or advice. Therefore, through use of the invention, trust metrics are developed based on the appearance (e.g. through duration of communications) of usefulness of information provided and/or subjective evaluation of the usefulness of information provided to the decision-maker(s) by the experts which can be located and contacted through use of the invention while the trust metrics are automatically and adaptively developed through monitoring of parameters of communications with such experts.

It should also be noted that while trust metrics T1 and T2 consider a trust metric in regard to particular subject matter specified in an inquiry, trust metric T3 does not. Thus, T3 may cause a recommendation of an "expert" who is well-trusted as indicated by closeness of association in the decision-maker's social network but who may have little or no established expertise in the particular subject matter. However, if such an "expert" is able to provide useful information (such as a good referral to an actual expert in the specified subject matter), a degree of effective expertise in regard to that subject matter may be attributed to that person in the form of increased attributed trust to be able to again provide useful information in regard to that subject matter when called upon to do so in the future. Therefore, it is deemed preferable to include use of a trust metric such as T3 where actual subject matter expertise is of lesser effective importance than "social" trust which, in combination with use of other trust metrics which emphasize subject matter expertise, allows the invention, through use, to develop a database including trust metrics which more closely and effectively reflect the actual effective extent and content of available human resources.

Thus, the user can manipulate and control the relative weighting of an arbitrary number of trust metrics to customize the calculation of trust which will affect the contacts and their ranking returned by the system and methodology of the invention. For example, if the decision-maker is not immediately familiar with an expert in regard to particular subject matter, giving greater weight to the T2 trust metric than to the T1 trust metric will effectively broaden the search by giving weight to experiences of others in the community. Further, if the closeness of acquaintance to the decision-maker is considered to be of significance, giving significant weight to trust metric T3 may cause the search results to be re-ordered to place the more optimal combination of widely recognized expertise and closeness of acquaintance and the capability to work with the person to develop a useful result higher in the list of experts who may be called upon to provide desired information. Such weighting combinations, if deemed successful or productive of particularly useful results, may be stored directly for re-use in apparently similar circumstances or averaged (possibly in a weighted fashion based on recency or some other criterion) or otherwise computationally combined with other stored relative weight combinations and the result stored to adaptively optimize relative weight combinations the decision-maker finds to be productive as the present invention is repeatedly used.

Other trust metrics can, of course, be used but it is much preferred to include all three types 119*a*-119*c* of information with such other types of information. For example, while ratings or subjective evaluations are considered to be less reliable as trust metrics, such data types may still be collected as used or not in performing trust computations at the will of the operator by altering the weight accorded to them. For example, as alluded to above, an initial search could be conducted that accords no weight to ratings or subjective evaluations and then allowing the decision-maker to observe how ranking of experts in the results may or may not change when such data types are, in fact, accorded significant weight in trust computations.

Referring again to FIGS. 1A and 1B as well as to FIGS. 3-6, the operation of the invention will now be described. As alluded to above, normal functioning of enterprise 10 will cause some issues 12 to be developed from time-to-time which require an informed decision 14 to be made by a decision-maker 20 having responsibility therefor. The issue 12 is then duly communicated to decision-maker 20. Decision-maker 20 then determines the relevant subject matter for which expert information/opinion is required and communicates that subject matter as a search query to broker/agent 110 which conducts a search for suitable experts in database 130. Names (or other identification) and associated stored trust metrics (or data from which such trust metrics can be computed) are returned as search results. It is also preferred that such test results also include appropriate contact information associated with each name/identification returned. The decision-maker 20 also inputs weights through an interface or from storage as discussed above which are communicated to broker/agent 110. Using the specified weights, an overall trust computation is performed for each of the names/identifications returned as indicated at 120 and the names/identifications are sorted or ranked in descending order of overall trust as depicted at 150. The sorted list of experts is then returned to the decision-maker 20.

The decision-maker 20 can then review the sorted list and may alter the weights specified to observe effects of doing so on the sorted list. With or without performing such alteration of weights, the decision-maker 20 can then easily contact any or all of the experts 30*a*-30*n* which have been returned by the search conducted by broker/agent 110. Making contact is particularly facilitated if the search also returns contact information as alluded to above to be preferred. In such a case, the returned sorted list may then be used much in the nature of a menu for sending a message to any or all of the experts which have been recommended as most trusted. A threshold may be applied automatically by truncation of the list returned based on a minimum acceptable level of trust to justify contact, a limit on the number of name/identifications returned or the like or simply performed manually by selection from the returned sorted list.

The duration or message length of replies to such contact(s) may be monitored and the duration used as an indicator of the value or usefulness of information included therein. Other parameters of the message such as use of terms of art, speed of speech or reply, voice frequency variation and the like which can be readily monitored through the networked communications platform can also or alternatively be used as a metric of the value of the communication although time is much preferred for its simplicity and logical reliability. It should be noted that a reply to a contact may result in a series of communications between the decision-maker 20 and particular ones of experts 30*a*-30*n* over an extended period of time. Therefore, it is preferable to monitor only the actual length or duration of the actual messages exchanged rather than the overall period of time that the communications take place. Also, while it is assumed in using message duration or length as an indicator of information value and that communications appearing to be of lesser value to the decision-maker will be terminated, it is possible that second and subsequent communications from the decision-maker may include clarifications, further questions or the like which may bias the communication duration or length. Thus, the length or duration of communications may be given different weights depending on the direction of the information or other criteria developed by techniques such as parsing communication from the decision-maker for question marks or the like to improve the accuracy of the inference of value of information from communication length or duration. Thresholds may also be applied to avoid an expert from biasing this inference by, for example, providing lengthy replies. Upon completion of the communication sequences with a respective expert, the total communication length or duration is stored, preferably locally to the decision-maker as indicated by store 170.

Figure 3:
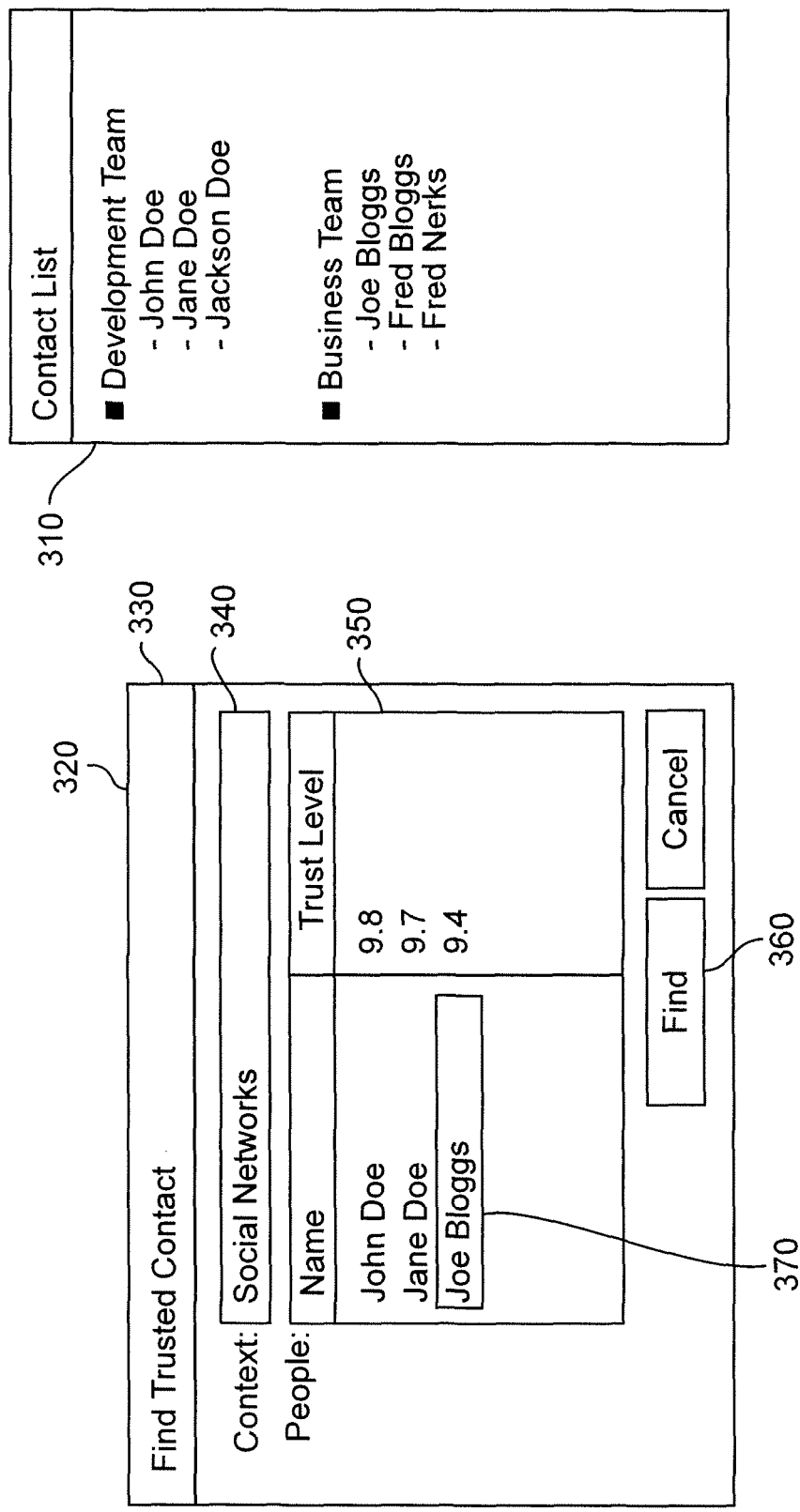
FIG. 3 is a diagram of an exemplary screen for facilitating use of the invention.

More specifically, referring to FIG. 3, an initial screen may be displayed at the will of the decision-maker to make an initial approach to location of one or more experts for advice on responding to an issue 12. It is preferable that an initial contact list including persons involved in the enterprise or project be initially provided as illustrated at 310. Contact information is preferably returned but need not be displayed since the contact list, itself, preferably containing lists of persons on a development team, business team or the like can be used as a menu to initiate contacts.

In this particular case, it is assumed that the issue 12 was raised at an early point in the enterprise or project or at least an early point in the decision-maker's involvement therewith. The decision-maker may initially wish to be reminded of those in the contact list with whom the decision-maker has worked before and how well. Thus, for example, the decision-maker, using window 320 may specify a Find Trusted Contact operation 330 (e.g. from a menu), specify Social Contacts as a context 340 and actuate Find button 360; which query is issued to the broker/agent 110 and a search conducted in trust database 130. This results in list 350, ordered by descending trust ratings using weights also retrieved from storage 130 or computed from data retrieved therefrom. This list may be exhaustive or may be truncated by trust level or a maximum number of names/identifiers or the like which may be input to the system in any manner including pull-down menus or the like, particulars of which are not important to the successful practice of the invention. A cursor 370 can be used in either list 310 or list 350 (used as a menu) to initiate a contact with a selected person.

The same screen illustrated in FIG. 3 could be used with any of a number of different contexts for which trust statistics and/or communication parameters are accumulated being specified. Such alternative contexts are preferred to be specific to subject matter areas or at least particular operational divisions of a company or enterprise. For example, such subject matter or corporate divisions such as "Healthcare Systems Development, "Services Science Management and Engineering" or "Cognitive Computing" could be specified as domains for a search. In such a case, the names/identifiers would be sorted by both field of expertise and the accumulated trust statistics and associated computations corresponding to previous inquiries relating to that subject matter area and would likely provide a much differently ordered result. Additionally, overall trust levels for the names/identifiers returned may be optionally displayed in a manner similar to that illustrated in field/window 350 of FIG. 5. Searches may be made on a plurality of contexts associated with Boolean operators in a manner well-understood in the art. Likewise, the results of several Find Trusted Contact searches may be saved and combined using Boolean operators in a manner well-understood in the art to develop composite lists or reduce the number of names/identifiers returned.

Figure 4:
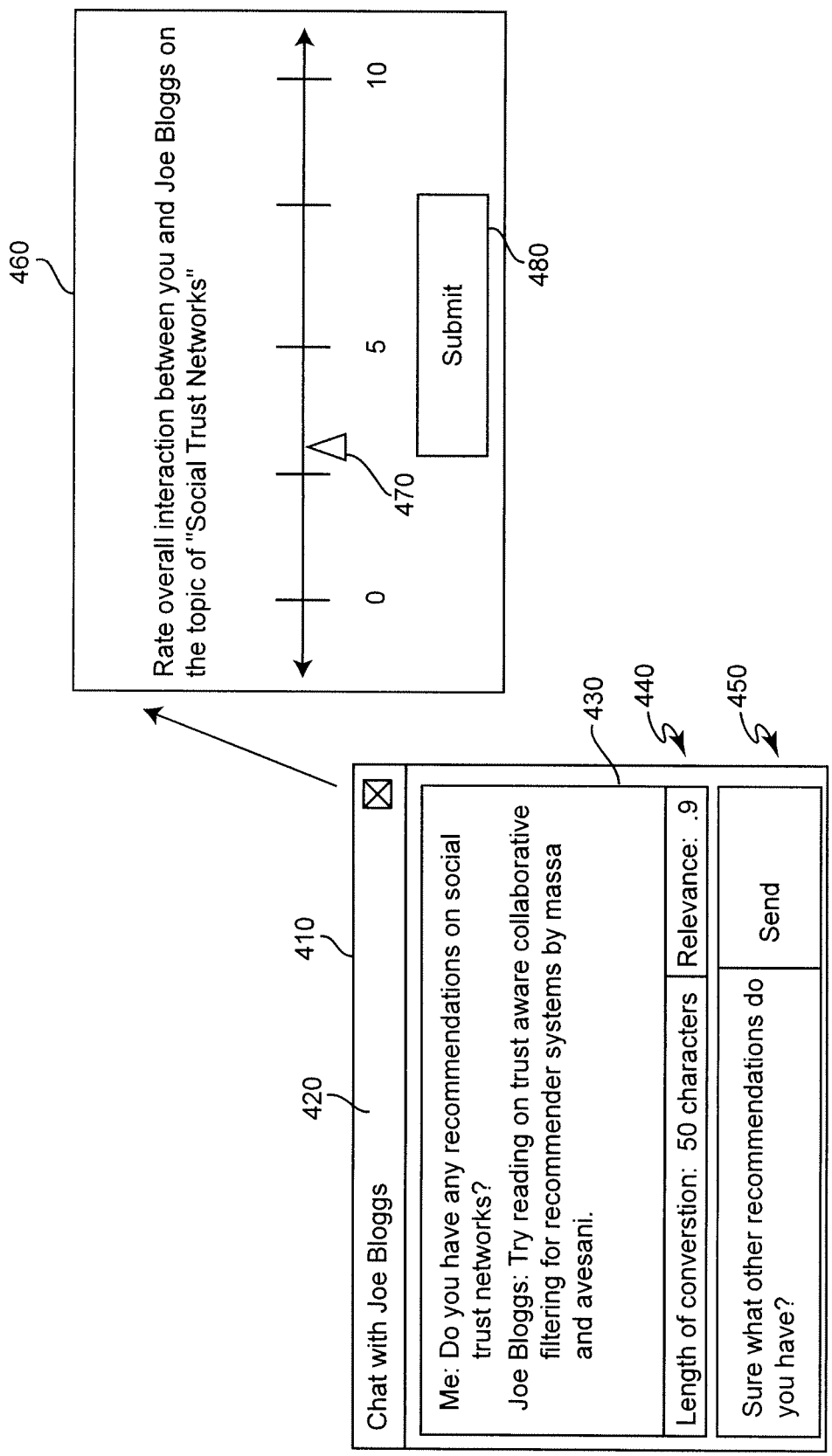
FIGS. 4, 5 and 6 illustrate other exemplary screens for use of the invention to adaptively develop and expertise database.

Referring now to FIG. 4, assuming that the decision-maker wishes to communicate with Joe Bloggs, a chat screen or voice connection is opened responsive to a selection from either list 310 or 350 and actuation of Find button 360. A chat screen 410 is assumed as being more fully illustrative of the operation of the invention although other communication technologies are preferably made available as alluded to above in connection with FIG. 1A. Using chat screen 410, a question can be posed to Joe Bloggs and an answer returned and displayed in field 430 while the parameters of the communication such as duration and/or number of characters are monitored. In general the duration or length of the reply is preferably accorded more weight than the overall length or duration of the full communication. In this case, the response is very terse and general as merely suggesting review of a publication (e.g. the article incorporated by reference above) as may be determined by parsing the response and is thus assigned a relevance or responsiveness score of 0.9. The length of the answer is monitored and determined to be fifty characters in length. These running evaluations are preferably displayed in a field 440. The chat may be continued at the will of the decision-maker using field 450 with further accumulation of information concerning parameters of the communication (e.g. length/duration and/or apparent relevance) or terminated (e.g. by sending a null field).

At the termination of the communication, an evaluation window or screen 460 may optionally be presented, as is preferred, to the decision-maker to rate the value of the overall interaction of the communication (e.g. using a pointer 470). This information can be separately stored or combined with the accumulated communication parameters displayed at 440 in a manner not important to the practice of the invention and the result combined with previously acquired trust information in trust database 130. It is believed that by obtaining such information in a manner so convenient and intuitive for the decision-maker immediately after termination of the communication is far less likely to be skewed by collusion or other factors which have caused previously known rating systems to provide unreliable results.

The storage and accumulation of such information allows automatic and adaptive building and maintenance of trust database 130 by leveraging capabilities of the communication platform(s) and operating the communication platform(s) from the search engine or decision-maker interface thereto. For example, assuming the decision-maker has similar communications with John Doe and Jane Doe and the latter is longer and more useful than the former, the trust ratings may dynamically change and be reflected in an altered list 350 such as that indicated in FIG. 5 with Joe Bloggs being deleted due to providing only a small amount of information of low relevance/utility and reducing the accumulated trust score and inclusion of Jackson Doe either through alteration of thresholds or a change in weighting to bring the overall trust for Jackson Doe above the overall trust of John Doe and Jane Doe whose personal trust level relative to the decision-maker remained higher. It is important to note that all communications performed through use of the invention may potentially alter the trust metrics of the persons with which the communications are conducted and the current trust statistics and computed trust metrics are available and will be reported in any subsequent search using the invention unless provision is made to avoid doing so, which is not preferred.

Figure 5:
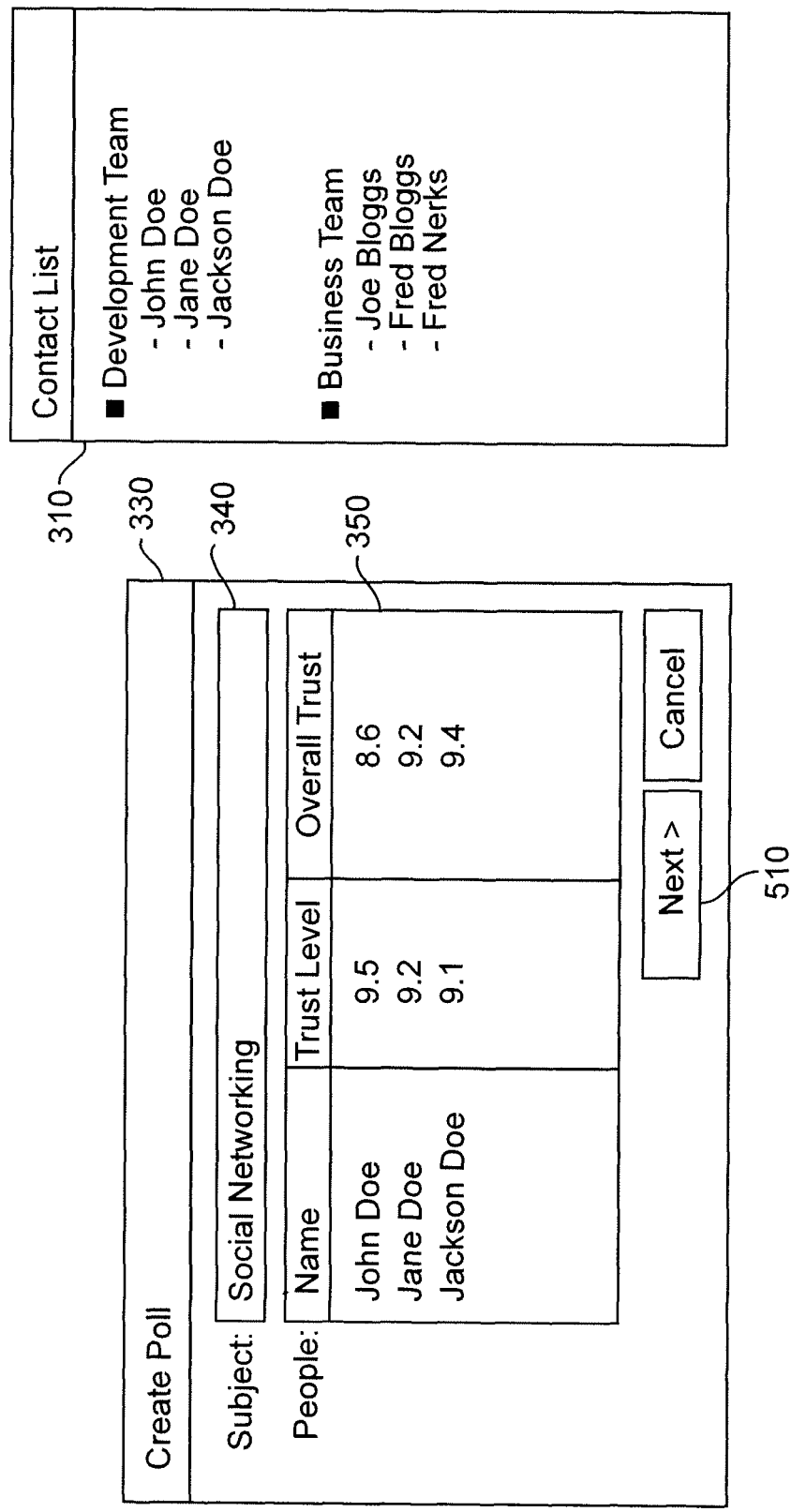
Figure 6:
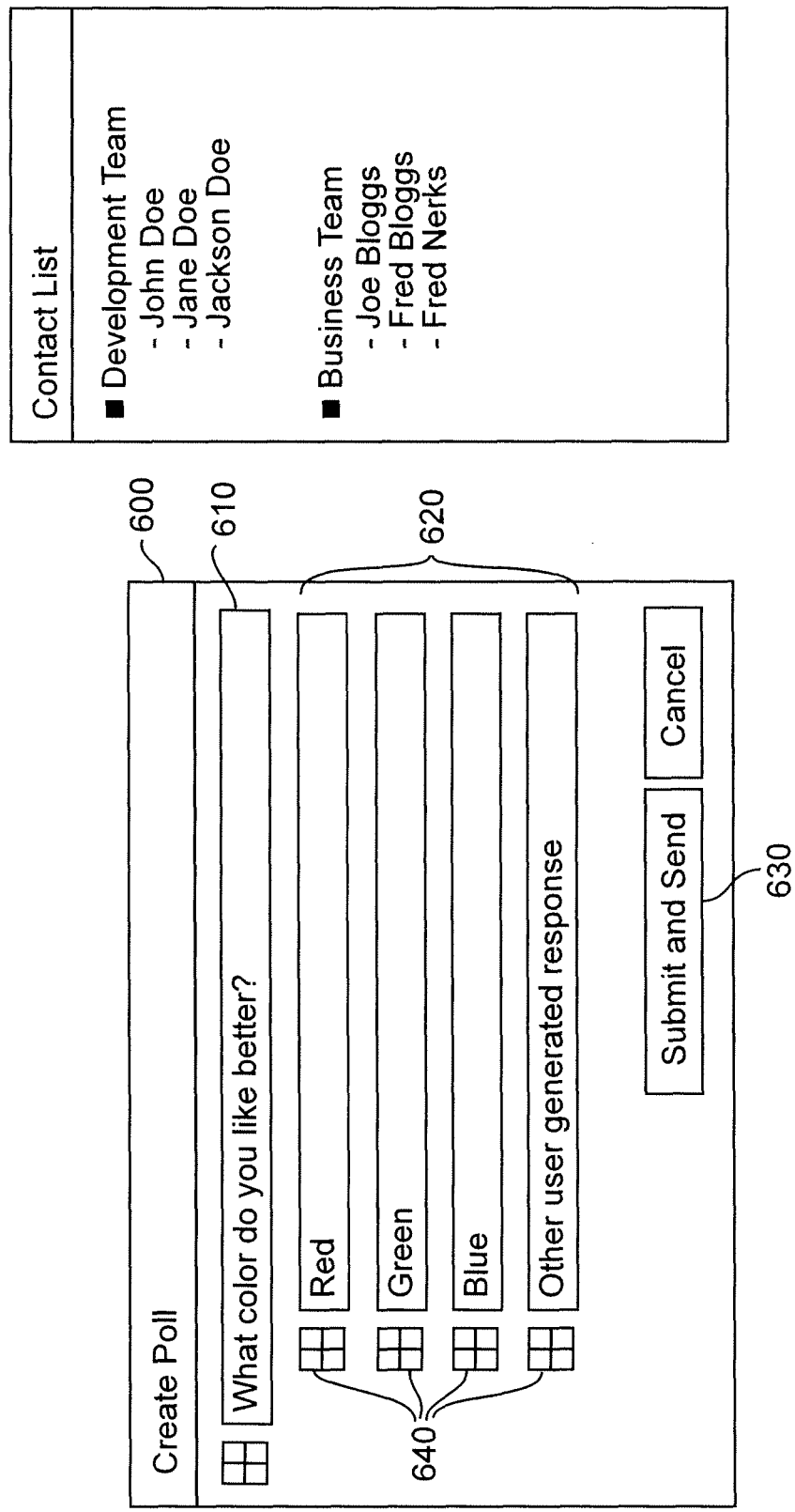

Another function that is provided by the invention is the possibility of polling trusted experts; a suitable window for which is illustrated in FIGS. 5 and 6. It will be noted from a comparison of FIGS. 3 and 5 that FIG. 5 differs from FIG. 3 in not only the Title of the screen but also calls for a subject rather than a context and provides a Next button to invoke another screen as may be desired for creation of the poll. In this case, the Subject is Social Networking (e.g. persons having a wide variety of social contacts that are frequently consulted or with whom the persons frequently consult. In this case, the names/identifiers returned happen to coincide with the development team listed in list 310. As with the Find Trusted Contact operation described above, the list provided in field 350 can be freely manipulated and edited by the decision-maker by truncation, substitution, addition or the like. It is considered desirable to also display an overall trust level in list 350 in addition to the individual trust level of the decision-maker for each candidate listed in list 350 to aid in editing.

When the list 350 has been edited to the satisfaction of the decision-maker, the Next button 510 may be actuated to invoke a screen such as that shown in FIG. 6 for creating and conducting a poll of those persons/experts listed using the screen illustrated in FIG. 5 and discussed above. This screen for creating and conducting a poll includes window 610 for posing a question to the listed persons/experts and a plurality of option windows 620 including a window in which a polled recipient of the message can provide a written response. These option windows can allow for a response by simply marking a response or ranking in order of preference in locations 640. Once the question 610 has been composed by the decision-maker, button 630 may be actuated and the edited polling window (preferably window 600 alone) is communicated to the listed users of the system of the invention as discussed above.

The responses of users are accumulated as responses occur and may be graphically displayed to the decision-maker who may continue the polling or not to reach a consensus, derive additional information or refine the responses under control of poll management component 109b. It should be noted that in the case of polling, the duration of creating the poll is not part of the duration of the communication and the elapsed time duration before response is unlikely, in many instances, to have a significant bearing on trust while the actual time expenditure for the response will be substantially equal for all those polled. Accordingly, it is deemed preferable in the case of polling through use of the invention, to collect trust statistics based on the parameter of degree of agreement on an individual answer with polling responses from other persons/experts polled with some adjustment possibly made for agreement with the decision-maker if different from the majority of those polled as may be provided by suitable control of poll management component 109*b*. Some aspects of trust may also be indicated by collected statistics in regard to the numbers of times a given expert responds relative to the number of times that given expert has been polled. Such trust information is managed and stored in database 130.

As many searches or polls may be conducted as may be desired by the decision-maker to find suitable experts and to obtain information and results of individual searches or logical combinations thereof and a record of information obtained can be stored locally, such as in storage 170. When an amount of information deemed suitable to the decision-maker has been developed, a decision is made and communicated back to enterprise 10 as indicated at 14. When a decision is thus made and communicated, issue 12 may be regarded as closed and, if not accumulated concurrently with the communications, the communication length/duration or other communication parameters which may infer an adaptive adjustment of trust for particular persons with whom communications were conducted, adjusted as may be desired or deemed appropriate, is transferred from the decision-maker 20 to broker/agent 110 and added to database 130.

This transfer may be performed selectively for respective experts, again preferably from the sorted list, by the decision-maker based on a subjective evaluation of the relative value of the information received to the resulting decision. Such transferred information can include a binary or quantitative indication of agreement between the decision-maker and expert and/or a quantitative incremental trust metric to be accumulated with similar values may include other qualitative or quantitative evaluations of the expert in terms of incremental trust to perform as well in the future in regard to the specified subject matter. Further, contact of a particular decision-maker with a particular expert may, over time, alter the level the expert may occupy in the decision-maker's personal social network; altering any trust metric principally based thereon (e.g. T3). Thus, trust metrics and statistics are adaptively updated as the system is used and trust metrics are preferably computed as searches are made to improve the consistency and ease of use in reliably locating an expert for any desired subject matter or circumstances where input from an expert is desired for making an informed decision. It is also preferred that any trust metrics may be altered either positively or negatively at the will of the decision-maker and/or the expert depending on performance in regard to the current issue 12.

It is also considered preferable, when a decision is made and an issue closed, to allow the decision-maker to specify particular subject matter which the issue 12 addresses if no trust statistics have been previously accumulated in regard to that particular subject or context to provide for adaptive increase of the scope of subject matter for which the invention can provide useful searches. For example, if a subject or context is specified as discussed above in regard to which no expertise had been previously sought, the decision-maker could still locate trusted persons by searching through social networks as described above and useful results obtained even if only determining that certain persons have no expertise relevant to the issue. At the conclusion of searching and/or a decision being made, the subject matter can be entered and the communication parameter statistics collected applied thereto as well as to the social network subject or context so that, thereafter, that subject or context can be searched in the manner of any other subject or context. Thus it is seen that the invention can be initially implemented with only a social network and context or even basic personal profiles being searchable against a relatively small population of names/identifiers and the entirety of trust data in database 130 adaptively accumulated through use.

Figure 7:
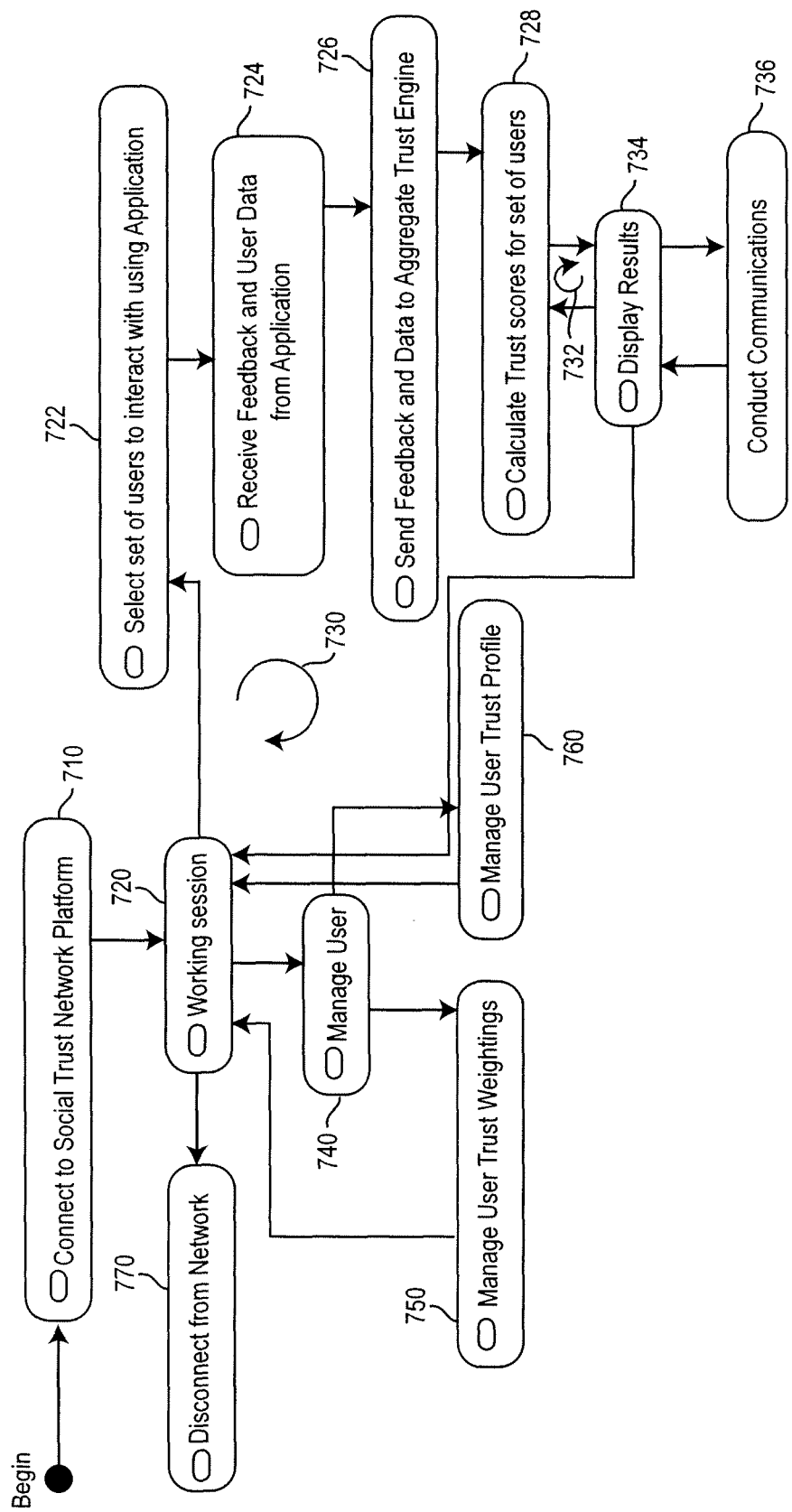
FIG. 7 is a data flow diagram indicating communications through a messaging platform during operation of the invention.

Thus, in summary, the operation of the invention is illustrated in FIG. 7 and will be discussed with reference to FIG. 1B, as well. The process begins by accessing/connecting to the trust network platform 100*b* and beginning a working session as depicted at 710 and 720, respectively. As an overview, a working session comprises a portion in which the system is interactive with a user as depicted generally by loop 730 and a portion which is substantially transparent to the user in which the results of the interactive portion of the session are managed, as depicted as 740.

As part of the interactive portion 730 of the working session 730, applications 100*a* may be accessed to conduct a search using application. Once a search has been completed or a set of experts otherwise selected, other applications 100*a*, such as polling application 105*b* can be invoked and the interactive portion 730 of the working session repeated to allow the user to interact with the invoked application.

Assuming a search is to be conducted, upon invoking the trusted contacts search application 105*a*, database 130 will be accessed and a set of users/experts selected for interaction by the decision-maker as depicted at 722. Trust data stored with identifications of users/experts corresponding to data types 119 and also contact data will preferably be returned as depicted at 724. Trust metrics are then sent to aggregate trust engine 115*b*, as depicted at 726 and trust scores computed (728) from the trust data 119. As alluded to above, the computations may be interactively altered at will by manipulation of weights applied by the decision-maker using the interface feature of FIG. 2D or the like and the results of each such interactive manipulation (depicted as loop 732) displayed at 734, preferably as an ordered list from which selections may be made in the manner of a menu as alluded to above for conducting communications 736 if the search results are satisfactory. Depending on the technology by which the communications are conducted, the communications may be displayed and manipulated as described above in connection with FIG. 4. If the search results are not satisfactory (e.g. the ordering of results appears unstable due to changes in results with small changes in applied weights) the decision-maker can return directly to the working session 720 to conduct another search which may or may not be logically combined with one or more previous searches as alluded to above. In any case, this concludes an iteration of the interactive portion of the working session 720 which can then be repeated in accordance with loop 730 for another search or invoking another application.

Communication parameters are collected by conversation quality component 107*b* while the communications 736 are conducted and, when an iteration of the interactive portion of the working session is concluded after communications 736 have been conducted, window 460 (FIG. 4) is preferably displayed to allow the decision-maker to subjectively rate the value of the communications. When a rating has been submitted (if such a rating is performed) the transparent management portion 740 of the working session may begin using collected communication parameters either as raw data (if a rating is not performed) or using the subjective rating as a weighting to be applied thereto. A record of subjective ratings applied by respective decision-makers can also be maintained and corrected as may be appropriate if the subjective ratings applied by a given decision-maker are consistently too high or too low and, if desired, such corrections may be used to perform similar corrections in trust data. Preferably, the management portion 740 of the working session 720 separately manages the user trust weightings 750 by computation and storage in accordance with the expert identification(s) and subject matter of the search using trust weightings management 117*a*, including storage of weighting among data types 119 which provided satisfactory results and user profile management 760 to, for example, add a subject matter expertise category to a user profile in database 130 using user profile management subsystem 117*b*. As alluded to above, while the invention is intended to principally use trust data types 119 as those data are accumulated adaptively through use of the system, profiles are available in database 130 and are the principal data resource to be searched during early usage of the invention and as a default when trust data in regard to particular subject matter has not been accumulated in sufficient degree to provide high confidence. Therefore, it is preferred, as a perfecting feature of the invention not necessary to its practice in accordance with the most basic principles of the invention, to use collected trust data to appropriately update user profile information, as well. For example, recognized expertise of a user indicated by high trust data levels may reflect acquisition of expertise in regard to particular subject matter through experience and is preferably reflected in the profile of that user. Once the collected trust data has been managed as desired, the social trust network of the invention can be disconnected from the network as depicted at 770.

In view of the foregoing, it is clearly seen that the invention leverages the experience an individual decision-maker and/or that of a community to facilitate location of one or more experts capable of reliably providing assistance in the making of informed decisions involving any arbitrary subject matter and even referrals to other experts as well as automatically and adaptively developing trust metrics reflecting performance of respective experts in regard to particular subject matter or circumstances. Any trust metrics deemed suitable may be employed and are a function or reflection of effectiveness of performance in response to actual issues as an indicator of the degree to which a given expert may be expected to perform in regard to particular subject matter when an issue arises. Thus, the invention allows selection of one or more experts most likely to be effective in regard to any particular issue and to facilitate communications with the expert while extracting information from the communications to adaptively develop trust metrics to be used in regard to issues that may arise in the future from the same or a different enterprise. The invention thus implements trust metrics over a messaging platform which also facilitates communications to presumably reliable sources of needed information and leverages the capabilities of the messaging platform to enhance the reliability of the selection of such sources of information.

While the invention has been described in terms of a single preferred embodiment, those skilled in the art will recognize that the invention can be practiced with modification within the spirit and scope of the appended claims.

What is claimed is:

1. A social trust network implemented in combination with a networked communication platform which monitors information in messages communicated through a network, said social trust network comprising:
    a processor executing an application for conducting a search of a database to return identifications of one or more persons or groups of individuals and corresponding trust data and communication data;
    a trust network platform including an aggregate trust engine for computing a trust metric from said trust data, said trust metric being a quantitative metric of likelihood of a person or group of individuals providing information which is useful or of value to a user;
    an arrangement operatively associated with said networked communications platform for selective communication between said user and said one or more persons or groups of individuals using said communication data;
    monitoring means operatively associated with said networked communications platform, wherein said monitoring means are configured to parse a message of said selective communication, and extract information from the parsed message including at least one of tone of speech, speed of speech, and voice frequency variation expressed as quantitative metrics of a value or usefulness of said message to said user; and
    a user trust management subsystem for deriving additional trust data from said information of said selective communication monitored through said networked communication platform and storing said additional trust data in said database for inclusion in said computing of a trust metric corresponding to said person or group of individuals;
    wherein said message is from one of said one or more persons or groups of individuals and is responsive to an inquiry by said user,
    wherein said aggregate trust engine computes a plurality of trust metrics from said trust data, and wherein one of said plurality of trust metrics is a weighted sum of others of said trust metrics.

2. The social trust network as recited in claim 1, wherein said trust management subsystem combines said additional trust data with trust data in said database.

3. The social trust network as recited in claim 1, wherein said database includes profiles of said one or more persons or groups of individuals and said search includes searching said profiles.

4. The social trust network as recited in claim 1, further including means for supplying weights to said aggregate trust engine for computation of said weighted sum.

5. The social trust network as recited in claim 4, wherein said means for supplying weights includes means for adjusting relative weight of said weights.

6. The social trust network as recited in claim 5, wherein said means for adjusting relative weight includes a displayed graphic feature.

7. The social trust network as recited in claim 1, wherein said search conducted by said processor additionally returns communication contact information for said one or more persons or groups of individuals.

8. The social trust network as recited in claim 1, further including means for creating and managing results of a poll of a plurality of said persons or groups of individuals returned by said search.

9. The social trust network as recited in claim 1, wherein said information includes at least two selected from said group consisting of tone of speech, speed of speech, and voice frequency variation.

10. A method of identifying trusted entities, said method comprising steps of searching a database containing at least profiles and trust data corresponding to respective persons or groups of individuals;

computing a trust metric from said trust data for a person or group of individuals of said respective persons or groups of individuals, said trust metric being a quantitative metric of likelihood of a person or group of individuals providing information which is useful or of value to a user;

reporting results of said search in accordance with said trust metric;

selectively conducting a communication with a person or group of individuals included in results reported by said reporting step to communicate a message between said person or said group of individuals and said user over a networked communications platform, wherein said message is from one of said respective persons or groups of individuals and is responsive to an inquiry by said user;

monitoring information in said message of said communication conducted in said step of selectively conducting a communication, wherein said step of monitoring includes parsing said message of said communication, and extracting information from the parsed message including at least one of tone of speech, speed of speech, and voice frequency variation expressed as quantitative metrics of a value or usefulness of said message to said user; and storing data corresponding to said one or more parameters as trust data in said database for inclusion in a repetition of said step of computing a trust metric, wherein said computing step computes a plurality of trust metrics, and wherein one of said plurality of trust metrics is a weighted sum of others of said trust metrics.

11. The method as recited in claim 10, wherein said step of storing data includes combining data corresponding to said information with trust data stored in said database.

12. The method as recited in claim 10, including the further step of supplying weights for computing said weighted sum.

13. The method as recited in claim 12, wherein said step of supplying weights includes the further step of adjusting relative weights of said weights for computing said weighted sum.

14. The method as recited in claim 13, wherein said step of adjusting relative weights includes manipulation of a displayed graphic feature.

15. The method as recited in claim 10 wherein said step of searching said database includes the further step of returning communication contact information for said respective persons or groups of individuals.

16. The method as recited in claim 10 including the further step of creating and managing results of a poll of a plurality of persons or groups of individuals included in said results reported by said reporting step.

* * * * *